Patented Dec. 30, 1947

2,433,542

UNITED STATES PATENT OFFICE 2,433,542

SULFURIC ACID ESTERS AND A PROCESS OF MAKING SAME

Jakob Bindler and Hans Schläpfer, Basel, Switzerland, assignors to J. R. Geigy A. G., Basel, Switzerland No Drawing. Application May 11, 1944, Serial No. 535,198. In Switzerland May 12, 1943

8 Claims. (Cl. 260—401)

It has been found that by condensation of compounds which contain at least once the atom grouping

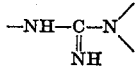

and a high molecular aliphatic radical with at least 12 carbon atoms, with alkylene oxides which are capable of addition in the molar ratio of 1 to at least 2 and by sulfonation of the hydroxyalkyl compounds valuable new capillary-active compounds are obtained. When compared with similar compounds which, however, only contain molecular quantities of hydroxyalkyl compounds, the new products obtainable according to the present invention are distinguished by improved properties, especially by an increased stability to hardening constituents of water and by a better solubility in water.

For the interaction with the reactive alkylene oxides use may be made of high molecular substituted acyl biguanides, cyanoguanidines, guanamines (triazines, etc.) the same having already been described in the patent literature. As alkylene compounds there may be mentioned especially ethylene oxide, but also α-propylene oxide, isobutylene oxide, alkyl ethylene oxides, glycide, epichlorohydrine and so on. The transformation into sulfuric acid esters, as well as the hydroxyalkylation of the high molecular substituted starting products is carried out according to known methods.

The present invention will now be described by way of examples, without being limited thereto. The parts are by weight.

Example 1

35 parts of stearoyl cyanoguanidine of the formula

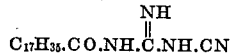

made from stearic acid and dicyanodiamide, are mixed with 0.2 part of sodium ethylate and at 140°–150° C. 22 parts of glycide are slowly dropped thereinto. The reaction takes place under a vigorous development of heat. The clear, bright brown melt is stirred for still further 14 hours at the same temperature until a homogeneous mixture has resulted. After cooling the condensation product is obtained in form of a brown waxy mass.

15 parts of this compound are dissolved at 60° C. in 20 parts of monohydrate and sulfonated at 20° C. with 20 parts of chlorosulfonic acid until water-solubility has been reached. The sulfonation mass is then poured onto ice and, after separation of the aqueous layer, neutralized by means of caustic soda lye. The final product forms a bright, water-soluble powder having very good capillary-active properties.

Example 2

20 parts of a condensation product of the probable formula

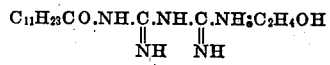

obtainable in a known manner from dicyanodiamide, cocoa fatty acid and ethanol amine, are condensed with the double molar quantity of glycide in the manner indicated in Example 1, then dissolved in 40 parts of monohydrate and sulfonated at 10°–15° C. with 40 parts of 26% oleum. After addition of the whole quantity of oleum stirring is continued at room temperature until a test sample has become clearly soluble in water. This being the case, the mixture is poured onto ice, neutralized and, after addition of common salt, the final product is extracted with isopropyl alcohol. After having dried the extract and distilled the extracting agent one obtains a bright powder which is easily soluble in water and possesses very excellent properties as washing and wetting agents as well as as lime-soap solvent and emulsifying agent. Its foaming power is also very good.

Example 3

23 parts of the compound prepared by methylation of ω-phenyl-ω'-stearoyl biguanide (22 parts of the biguanide compound are dissolved in 250 parts of chlorobenzene, treated with 6.3 parts of dimethyl sulfate and 5.5 parts of sodium carbonate and heated during 6 hours to 100°–110° C., then the inorganic salts and the solvent are removed, whereby a bright brown, fatty mass is obtained) are condensed with glycide in the manner described in Example 1. Thus a waxy mass is obtained.

10 parts of this condensation product are dissolved in 20 parts of monohydrate and dropwise treated at 0°–10° C. with 10 parts of 26% oleum. Stirring is continued at room temperature until a test sample is soluble in a dilute sodium carbonate solution. The working up is carried out as described in Example 1. The final product possesses good properties for stripping purposes for vat dyestuffs.

Example 4

32.5 parts of cocoa fatty acid hydroxyethyl biguanide of the formula

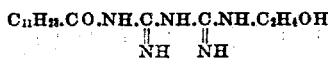

are condensed in the usual manner with 9 parts of ethylene oxide, then sulfonated and worked up according to the method indicated in Example 3. The final product thus obtained is a bright powder with good capillary-active properties.

Instead of glycide or ethylene oxide used in the above examples, the other reactive alkylene oxides mentioned in the general part of this specification, such as α-propylene oxide, iso-butylene oxide, epichlorohydrine and the like, may quite well be used, without changing substantially the properties of the final products. By increasing the quantity of hydroxyalkylating agents mentioned in the examples, for instance by using the one and a half-, two-, three- or fourfold quantity, etc., compounds with similar properties are obtained.

What we claim is:

1. Process for the manufacture of a sulfuric acid ester which comprises hydroxyalkylating a compound of the formula

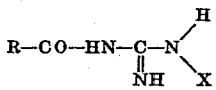

wherein R—CO represents the radical of a fatty carboxylic acid with 12 to 18 carbon atoms and X represents a member selected from the group consisting of cyano and amidino radicals, with 2 to 12 molar portions of an alkylene oxide, and sulfonating the so-obtained hydroxyalkylated compound.

2. Process for the manufacture of a sulfuric acid ester, which comprises hydroxyalkylating 1 mole of stearoyl cyano guanidine of the formula

with three moles of glycide and sulfonating the so-obtained hydroxyalkylated compound.

3. Process for the manufacture of a sulfuric acid ester, which comprises hydroxyalkylating 1 mole of the condensation product of dicyanodiamide with cocoa fatty acid and ethanolamine and having the probable formula

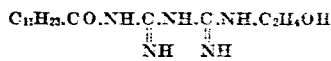

wherein $C_{11}H_{23}CO$— means the radical of cocoa fatty acid, with substantially 2 moles of glycide and sulfonating the so-obtained hydroxyalkylated compound.

4. Process for the manufacture of a sulfuric acid ester, which comprises hydroxyethylating one mole of cocoa fatty acid hydroxyethyl-biguanide of the probable formula

wherein $C_{11}H_{23}CO$— means the radical of cocoa fatty acid, with substantially 2 moles of ethylene oxide and sulfonating the so-obtained hydroxyalkylated compound.

5. A sulfonic acid ester containing the atom grouping

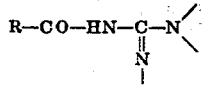

wherein R—CO represents the radical of a fatty carboxylic acid with 12 to 18 carbon atoms, from the hydroxyalkylation of a compound of the formula

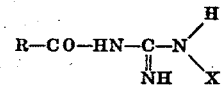

wherein R—CO has the above-indicated significance and X represents a member selected from the group consisting of cyano and amidino radicals, with from 2 to 12 molar portions of an alkylene oxide, and sulfonating the so-obtained hydroxyalkylated compound.

6. The sulfonic acid ester from the hydroxyalkylation of 1 mole of stearoyl cyano guanidine of the formula

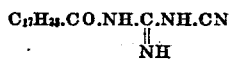

with three moles of glycide and sulfonating the so-obtained hydroxyalkylated compound.

7. The sulfonic acid ester from the hydroxyalkylation of 1 mole of the condensation product of dicyanodiamide with cocoa fatty acid and ethanolamine which condensation product has the probable formula

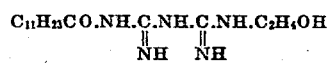

wherein $C_{11}H_{23}CO$— means the radical of cocoa fatty acid, with substantially 2 moles of glycide and sulfonating the so-obtained hydroxyalkylated compound.

8. The sulfonic acid ester from the hydroxyethylation of one mole of cocoa fatty acid-hydroxyethyl-biguanide of the probable formula

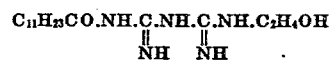

wherein $C_{11}H_{23}CO$— means the radical of cocoa fatty acid, with substantially 2 moles of ethylene oxide and sulfonating the so-obtained hydroxyalkylated compound.

JAKOB BINDLER.
HANS SCHLÄPFER.

REFERENCES CITED

The following references are of record in the file of this patent:

UNITED STATES PATENTS

| Number | Name | Date |
| --- | --- | --- |
| 2,002,613 | Orthner et al. | May 28, 1935 |
| 2,008,649 | Ulrich et al. | July 16, 1935 |
| 2,098,551 | Orthner et al. | Nov. 9, 1937 |
| 2,187,823 | Ulrich et al. | Jan. 23, 1940 |
| 2,214,352 | Schoeller et al. | Sept. 10, 1940 |
| 2,315,765 | Bindler | Apr. 6, 1943 |